(12) United States Patent
Schomaker et al.

(10) Patent No.: US 7,786,202 B2
(45) Date of Patent: Aug. 31, 2010

(54) PROCESS FOR PREPARING ORGANICALLY MODIFIED LAYERED DOUBLE HYDROXIDE

(75) Inventors: Elwin Schomaker, Arnhem (NL); Robin Winters, Bemmel (NL)

(73) Assignee: Akzo Nobel N.V., Arnhem (NL)

( * ) Notice: Subject to any disclaimer, the term of this patent is extended or adjusted under 35 U.S.C. 154(b) by 84 days.

(21) Appl. No.: 12/096,485

(22) PCT Filed: Dec. 4, 2006

(86) PCT No.: PCT/EP2006/069261

§ 371 (c)(1),
(2), (4) Date: Jun. 23, 2008

(87) PCT Pub. No.: WO2007/065877

PCT Pub. Date: Jun. 14, 2007

(65) Prior Publication Data

US 2008/0300352 A1      Dec. 4, 2008

Related U.S. Application Data

(60) Provisional application No. 60/813,374, filed on Jun. 14, 2006.

(30) Foreign Application Priority Data

Dec. 6, 2005  (EP) ................................ 05111752
May 30, 2006 (EP) ................................ 06114707

(51) Int. Cl.
*C08K 5/05* (2006.01)
(52) U.S. Cl. .................. 524/381; 524/379; 524/386
(58) Field of Classification Search .................. 524/424, 524/379, 381, 386; 556/182
See application file for complete search history.

(56) References Cited

U.S. PATENT DOCUMENTS 5,578,286 A     11/1996  Martin et al.
2008/0293957 A1*  11/2008  Winters et al. .............. 556/182

FOREIGN PATENT DOCUMENTS

DE       198 36 580       2/2000
WO       WO 00/09599      2/2000

OTHER PUBLICATIONS

Paul J. Flory, "Types of Polymeric Substances: Definitions and Classifications," *Principles of Polymer Chemistry*, Chapter 2, pp. 29-37, 1953.
Zinkel et al., "Chemistry of Rosin," *Navel Stores: Production—Chemistry—Utilization*, Chapter 9, pp. 261-331, 1989.
Dimotakis et al., "New Route to Layered Double Hydroxide Intercalated by Organic Anions: Precursors to Polyoxometalate-Pillared Derivatives," *Inorganic Chemistry*, vol. 29, No. 13, pp. 2393-2394, 1990.
Cavani et al., "Hydrotalcite-Type Anionic Clays: Preparation, Properties and Applications." *Catalysis Today*, pp. 173-301, 1991.
Borja et al., "Fatty Acids in Layered Metal Hydroxides: Membrane-Like Structure and Dynamics," *The Journal of Physical Chemistry*, vol. 96, No. 13, pp. 5434-5444, 1992.
Bookin et al., "Polytype Diversity of the Hydrotalcite-Like Minerals II. Determination of the Polytypes of Experimentally Studied Varieties," *Clays and Clay Minerals*, vol. 44, No. 5, pp. 558-564, 1993.
Tagaya et al., "Surface Modification of Inorganic Layer Compound with Organic Compound and Preparation of Thin Films," *Applied Surface Science*, vol. 121-122, pp. 476-479, 1997.
Simon Carlino, "The Intercalation of Carboxylic acids into Layered Double Hydroxides: A Critical Evaluation and Review of the Different Methods," *Solid State Ionics*, vol. 98, pp. 73-84, 1997.
Lieberman, R., "Polypropylene: Properties," *Kirk-Othmer Encyclopedia of Chemical Technology*, Chapter 1, http://www.mrw.interscience.wiley.com/kirk/articles/polylieb.a01/sect2.html, online posting date Dec. 4, 2000.
Lieberman, R., "Polypropylene: Manufacture," *Kirk-Othmer Encyclopedia of Chemical Technology*, Chapter 2, http://www.mrw.interscience.wiley.com/kirk/articles/polylieb.a01/sect3.html, online posting date Dec. 4, 2000.

(Continued)

*Primary Examiner*—Peter Szekely
(74) *Attorney, Agent, or Firm*—Kenyon & Kenyon LLP

(57) ABSTRACT

The invention relates to a process for preparing a layered double hydroxide comprising a charge-balancing anion, the process comprising the steps of: (a) preparing a precursor suspension or solution comprising a divalent metal ion source, a trivalent metal ion source, water, and a solvent which is miscible with water and in which at least 5 g/l of a charge-balancing anion precursor can be dissolved; (b) treating the precursor suspension or solution to obtain the layered double hydroxide, wherein the charge-balancing anion precursor is added to the suspension or solution before, during or after step (b), and wherein, if the charge-balancing anion is an organic anion, less than 50 wt % of the charge-balancing anion precursors, based on the total weight of charge-balancing anion precursors, is a salt, with the proviso that the charge-balancing anion is not carbonate. The invention further pertains to a layered double hydroxide obtainable by this process.

20 Claims, No Drawings

OTHER PUBLICATIONS

Lieberman, R., "Polypropylene: Processing," *Kirk-Othmer Encyclopedia of Chemical Technology*, Chapter 3, http://www.mrw.interscience.wiley.com/kirk/articles/polylieb.a01/sect4.html, online posting date Dec. 4, 2000.

Lieberman, R., "Polypropylene: Uses," *Kirk-Othmer Encyclopedia of Chemical Technology*, Chapter 5, http://www.mrw.interscience.wiley.com/kirk/articles/polylieb.a01/sect6.html, online posting date Dec. 4, 2000.

Jay B. Class, "Resins, Natural", *Kirk-Othmer Encyclopedia of Chemical Technology*, Chapter 1, pp. 1-5, 2000.

International Search Report, PCT International Patent Application No. PCT/EP2006/069261, dated Feb. 20, 2007.

European Search Report, European Patent Application No. EP 06 11 4707, dated Nov. 11, 2006.

Written Opinion, PCT International Patent Application No. PCT/EP2006/069261, dated Feb. 20, 2007.

Response to Written Opinion, PCT International Patent Application No. PCT/EP2006/069261, dated Oct. 8, 2007.

International Preliminary Report on Patentability, PCT International Patent Application No. PCT/EP2006/069261, mailed Mar. 11, 2008.

\* cited by examiner

PROCESS FOR PREPARING ORGANICALLY MODIFIED LAYERED DOUBLE HYDROXIDE

REFERENCE TO RELATED APPLICATION(s)

This application is the U.S. National Phase of PCT/EP2006/069261 filed on Dec. 4, 2006 and claims the benefit of U.S. Provisional Application No. 60/813,374 filed on Jun. 14, 2006.

The invention relates to a process for preparing layered double hydroxides.

Such processes are known in the art. Cavani et al (*Catalysis Today,* 11 (1991), pp. 173-301) report various preparation methods for the production of layered double hydroxides. All the exemplified preparation methods are performed in water. Carlino (*Solid State Ionics,* 98 (1997), pp. 73-84) describes various preparation methods for intercalating carboxylic acids into layered double hydroxides, mainly using aqueous solutions.

Most processes for preparing layered double hydroxides are performed in water, causing the final dried product to have a considerable amount of water. Moreover, layered double hydroxides having hydroxyl or organic anions as charge-balancing ions generally form alkaline suspensions when re-dispersed in water. The considerable amount of water and the alkalinity of conventionally prepared layered double hydroxides may change the mechanical and physical properties of the resulting composite material when they are blended into polymeric matrices, e.g. blending may lead to depolymerization.

It is therefore an object of the present invention to provide a new process for preparing layered double hydroxides by which the alkalinity and/or the amount of water in the final product can be reduced. It is a further object to provide novel layered double hydroxides.

This object is achieved with a process for preparing a layered double hydroxide comprising a charge-balancing anion, the process comprising the steps of:

(a) preparing a precursor suspension or solution comprising a divalent metal ion source, a trivalent metal ion source, water, and a solvent which is miscible with water and in which at least 5 g/l of a charge-balancing anion precursor can be dissolved;

(b) treating the precursor suspension or solution to obtain the layered double hydroxide, wherein the charge-balancing anion precursor is added to the suspension or solution before, during or after step (b), and wherein, if the charge-balancing anion is an organic anion, less than 50 wt % of the charge-balancing anion precursors, based on the total weight of charge-balancing anion precursors, is a salt, with the proviso that the charge-balancing anion is not carbonate.

The use of the solvent in the process of the invention enables the production of layered double hydroxides containing a relatively low amount of water. The layered double hydroxide generally has an improved thermostability.

The process of the invention is particularly suitable to prepare layered double hydroxides comprising an organic anion as charge-balancing anion. These organically modified layered double hydroxides have a reduced alkalinity, i.e. will have a lower pH when re-dispersed in, e.g., water than conventional layered double hydroxides prepared in a conventional way. A higher degree of intercalation of the organic anion can be reached using the process of the invention. In general, layered double hydroxides, and in particular organically modified layered double hydroxides, will have an improved compatibility with a polymer into which they are blended.

In the process of the invention the solvent can be any solvent miscible with water and in which at least 5 g/l of a charge-balancing anion precursor can be dissolved. The miscibility of the solvent with water can be determined using ASTM D 1722-98. The solubility of the anion precursor may depend on the pH and/or temperature of the mixture. In the process of the present invention the conditions are chosen such—e.g. at reaction temperature—that at least 5 g/l of a charge-balancing anion precursor can be dissolved. Examples of such solvents include alcohols such as methanol, ethanol, n-propanol, isopropanol, n-butanol, i-butanol, and tert-butanol; alkane polyols such as ethylene glycol, propylene glycol, and glycerol; ethers such as dimethyl ether, diethyl ether or dibutyl ether; diethers of alkane polyols such as dimethyl ethylene glycol, diethyl ethylene glycol, dimethyl propylene glycol, and diethyl propylene glycol; and alkoxylated alcohols according to the formula

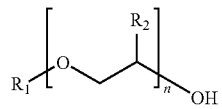

wherein $R_1$ is a $C_1$-$C_8$ alkyl or phenyl, $R_2$ is hydrogen or methyl, and n is an integer from 1 to 5; amines such as triethyl amine; non-ionic polymeric solvents such as polyethylene glycols, polypropylene glycols, lauryl polyethylene glycol; ionic liquids; pyridines; dimethyl sulfoxide; and pyrrolidones such as n-methyl pyrrolidone.

In one embodiment the solvent is a solvent that can form an azeotrope with water. Using an azeotropic mixture in the process of the invention makes for easier removal of the solvent and more effective removal of water.

Preferably, the solvent is an alcohol having one hydroxyl group. Examples of such an alcohol are monoalcohols like methanol, ethanol, n-propanol, isopropanol, n-butanol, i-butanol, and tert-butanol, and alkoxylated alcohols as defined above.

In one embodiment of the present invention, the solvent is an alkoxylated alcohol. Examples of such alkoxylated alcohols are ethylene glycol monomethyl ether, ethylene glycol monoethyl ether, ethylene glycol mono-n-propyl ether, ethylene glycol monoisopropyl ether, ethylene glycol monobutyl ether, ethylene glycol mono-t-butyl ether, ethylene glycol monohexyl ether, ethylene glycol monophenyl ether, ethylene glycol, 2-ethylhexyl ether, diethylene glycol mono-methyl ether, diethylene glycol monoethyl ether, diethylene glycol mono-n-propyl ether, diethylene glycol monoisopropyl ether, diehylene glycol monobutyl ether, propylene glycol monomethyl ether, propylene glycol monoethyl ether, propylene glycol monopropyl ether, propylene glycol monoisopropyl ether, propylene glycol monobutyl ether, propylene glycol mono-t-butyl ether, propylene glycol monohexyl ether, propylene glycol monophenyl ether, dipropylene glycol monomethyl ether, dipropylene glycol monoethyl ether, dipropylene glycol mono-n-propyl ether, dipropylene glycol monoisopropyl ether, and dipropylene glycol monobutyl ether. Of these alcohols ethylene glycol monomethyl ether and ethylene glycol monoethyl ether are less preferred, because they are teratogenic and may cause health problems.

The most preferred alkoxylated alcohols are propylene glycol monomethyl ether and propylene glycol monoethyl ether. Solvents are available, e.g., from Shell (Oxitol/Proxitol) and Dow (Dowanol) and Union Carbide (Carbitol/Cellosolve). It is also envisioned to use two or more solvents in the process of the invention. It is further contemplated to use a further organic solvent which is not miscible with water and/or in which less than 5 g/l of the charge-balancing anion precursor can dissolve. Suitable examples of such organic solvents include alkanes such as pentane, hexane, and heptane; ketones such as methyl amyl ketone, methyl ethyl ketone, methyl isobutyl ketone, and cyclohexanone; esters such as ethyl acetate and butyl acetate; unsaturated acrylic esters such as butyl acrylate, methyl methacrylate, hexamethylene diacrylate, and trimethylol propane triacrylate; and aromatic hydrocarbons such as benzene, toluene, and xylene.

The amounts of water and solvent used in the process of the invention can vary over a wide range. In one embodiment of the invention the amount of solvent is less than 50 wt %, based on the total weight of water and solvent, preferably less than 40 wt %, and most preferably less than 30 wt %.

The divalent metal ion source and the trivalent metal ion source used in the processes of the present invention can be any source known to the man skilled in the art. These sources include soluble salts of the divalent and/or trivalent metal ions as well as insoluble or partially insoluble divalent and trivalent metal ion sources, or mixtures thereof.

Soluble salts of metal ion sources include nitrates, chlorides, perchlorates, and also aluminates. The insoluble or partially insoluble divalent and trivalent metal ion sources generally include oxides or hydroxides, carbonates of the divalent or trivalent metal ions. Preferably, the sources are insoluble or partially soluble. Most preferably, the divalent and trivalent metal ion sources are oxides or hydroxides.

In the context of the present application "soluble salts" refers to divalent and trivalent metal ion sources that dissolve completely and form a clear solution at room temperature. In the context of the present application the term "insoluble or partially insoluble" refers to sources that do not dissolve completely and form a suspension at room temperature.

Examples of divalent metal ions are $Zn^{2+}$, $Mn^{2+}$, $Ni^{2+}$, $Co^{2+}$, $Fe^{2+}$, $Cu^{2+}$, $Sn^{2+}$, $Ba^{2+}$, $Ca^{2+}$, and $Mg^{2+}$. Examples of trivalent metal ions are $Al^{3+}$, $Cr^{3+}$, $Fe^{3+}$, $Co^{3+}$, $Mn^{3+}$, $Ni^{3+}$, $Ce^{3+}$, and $Ga^{3+}$. It is also contemplated to use three or more different metal ions in the layered double hydroxide prepared with the process of the invention. Among the above metal ions the combination of $Mg^{2+}$ and $Al^{3+}$ is preferred.

Examples of suitable magnesium sources which are insoluble or partially insoluble include magnesium oxide, magnesium hydroxide, magnesium hydroxycarbonate, magnesium bicarbonate, dolomite, and sepiolite. A combination of two or more magnesium sources is also contemplated.

The aluminium source which is insoluble or partially insoluble typically is a hydroxide or an oxide of aluminium. Examples of such an aluminium source are aluminium trihydroxides such as gibbsite and bayerite, aluminium oxohydroxides such as boehmite, diaspore or goethite, and transition aluminas, which are known to the man skilled in the art.

The use of the above insoluble or partially soluble divalent metal ion and trivalent metal ion sources in the process of the invention provides a process that is more environment-friendly, as considerably less salt—if any—remains in the waste stream resulting from the process. Moreover, the divalent and trivalent metal ion sources, and in particular the magnesium and aluminium sources, generally are less expensive than the corresponding salts commonly used in the production of layered double hydroxides. In addition, the process of the invention generally is simpler, as it requires fewer steps and/or does not require an after-treatment of the waste stream.

Furthermore, these processes may be performed in a much shorter time, which in turn may lead to a higher production rate of the organically modified layered double hydroxide compared to conventional processes.

In a preferred embodiment of the present invention, the insoluble or partially soluble divalent and/or trivalent metal ion sources, and in particular the magnesium and/or aluminium sources, are milled prior to step (b). In the processes of the invention the divalent and/or trivalent metal ion sources generally have a d50 value of less than 20 µm and a d90 value of less than 50 µm. Preferably, the d50 value is less than 15 µm and the d90 value is less than 40 µm, more preferably the d50 value is less than 10 µm and the d90 value is less than 30 µm, even more preferably the d50 value is less than 8 µm and the d90 value is less than 20 µm, and most preferably the d50 value is less than 6 µm and the d90 value is less than 10 µm. The particle size distribution can be determined using methods known to the man skilled in the art, e.g. laser diffraction in accordance with DIN 13320. This milling step allows the formation of the layered double hydroxide to proceed faster. It further may reduce the amount of impurities such as gibbsite or brucite if the divalent and trivalent metal ion sources are magnesium and aluminium sources.

In the context of the present application, the terms "treatment" and "treated", such as the treatment of step (b), refer to a treatment of the suspension at elevated temperatures. Such a treatment can be a thermal treatment or a solvothermal treatment. In the context of the present application the terms "thermal treatment" and "thermally" refer to the treatment of the precursor suspension or solution at a temperature between 30° C. and the boiling point of the precursor suspension or solution at atmospheric pressure. The temperature generally is from 40 to 120° C., preferably from 50 to 100° C., and most preferably from 60 to 90° C.

Additionally, the terms "solvothermal treatment" and "solvothermally" refer to the treatment of the precursor suspension or solution at a pressure above atmospheric pressure and a temperature which generally is above the boiling point of the precursor suspension or solution at atmospheric pressure. The pressure generally is from 1 bar to 200 bar, preferably from 2 bar to 150 bar, and most preferably from 3 bar to 100 bar. Generally, the temperature is 100° C. or higher, preferably from 100° C. to 300° C., more preferably from 110° C. to 250° C., and most preferably from 120° C. to 200° C.

The process of the invention can be conducted in the absence of $CO_2$ or any carbonate in the precursor suspension, so as to ascertain that no carbonate is incorporated into the layered double hydroxide as charge-balancing anion.

The process of the invention also pertains to the preparation of a layered double hydroxide comprising an organic anion as charge-balancing anion. Such layered double hydroxides are referred to as "organically modified layered double hydroxides" or "organoclays".

In one embodiment of the invention, the organic anion is added to the precursor suspension or solution before or while step (b) proceeds. In this way, the organically modified layered double hydroxide is prepared in one step, which generally renders the process simpler and quicker, and consequently more attractive economically.

The charge-balancing anion precursor can be a salt of an alkali metal or alkali earth metal, or a salt of the divalent and/or trivalent metal ion, or an acid, or mixtures thereof. In the process of the invention less than 50 wt % of the charge-balancing anions, based on the total weight of the charge-balancing anion precursors, is introduced into the suspension in the form of a salt. In order to reduce the amount of salt in the waste stream, it is preferred to use a mixture of the acid of the organic anion and the salt of the divalent and/or trivalent metal ion and the organic anion, or the acid of the organic anion. As indicated above, less than 50 wt % of the charge-balancing anions, based on the total weight of the charge-balancing anion precursors, is used in the form of a salt, preferably less than 30 wt % of the charge-balancing anions is a salt, and more preferably less than 10 wt % of the charge-balancing anions is a salt. It is also envisaged that salts of the charge-balancing anions are absent from the process of the invention, in order to reduce the amount of salts in the waste stream and/or the final product even further.

In one embodiment of the invention, the charge-balancing anion is an organic anion. The precursor of the organic anion can be a salt of an alkali metal or alkali earth metal, or a salt of the divalent and/or trivalent metal ion, or an acid, or mixtures thereof. The organic anion can be used in the above-indicated amounts.

Suitable examples of acids of organic anions include acetic acid, succinic acid, terephthalic acid, benzoic acid, caprylic acid, capric acid, lauric acid, myristic acid, palmitic acid, stearic acid, arachidic acid, decenoic acid, palmitoleic acid, oleic acid, linoleic acid, linolenic acid, and rosin.

It is also envisaged to add part of the organic anion prior to or during step (b), and to add the remaining part after the layered double hydroxide is formed.

Alternatively, the organic anion is added after the formation of the layered double hydroxide, in which case the layered double hydroxide comprises a charge-balancing anion selected from the group consisting of hydroxide, nitrate, chloride, bromide, phosphate, phosphonate, sulfonate, sulfate, bisulfate, or mixtures thereof. The invention pertains to a process as described above further comprising the steps of:

(c) preparing a suspension of a suspending medium and the layered double hydroxide comprising a charge-balancing anion selected from the group consisting of hydroxyl, nitrate, phosphate, phosphonate, sulfonate, sulfate, bisulfate, and halide;

(d) treating the suspension to obtain an organically modified layered double hydroxide, wherein an organic anion precursor is added during step (c) or (d).

Preferably, the charge-balancing anion of the layered double hydroxide used in step (c) is selected from the group consisting of hydroxide, nitrate, chloride, bromide, or mixtures thereof. Said charge-balancing anion can be easily exchanged with the organic anion. This exchange is advantageously enhanced by the use of the solvent of the invention in comparison to similar processes in water.

Alternatively, the invention pertains to a process for preparing a layered double hydroxide comprising an organic anion as charge-balancing anion, the process comprising the steps of:

(a) preparing a suspension of a layered double hydroxide comprising a charge-balancing anion selected from the group consisting of hydroxyl, nitrate, phosphate, phosphonate, sulfonate, sulfate, bisulfite, and halide, a solvent, and optionally water;

(b) treating the precursor suspension or solution to obtain the layered double hydroxide, wherein the organic anion precursor is added to the suspension during step (a) or (b), and wherein the solvent is miscible with water and can have at least 5 g/l of the organic anion precursor dissolved therein.

The layered double hydroxide used can be a layered double hydroxide prepared according to the process of the present invention, or alternatively, the layered double hydroxide can be prepared using conventional preparation processes.

If the process of the invention comprises the step of exchanging charge-balancing anions with organic anions after the layered double hydroxide is formed, the step of formation of the LDH and the exchange step can be performed thermally or solvothermally, or the formation step can be performed thermally and the exchange step can be performed hydrothermally or vice versa.

Within the context of the present application the term "charge-balancing anion" refers to anions that compensate for the electrostatic charge deficiencies of the crystalline LDH sheets. As the LDH typically has a layered structure, the charge-balancing anions may be situated in the interlayer, on the edge or on the outer surface of the stacked LDH layers. Such anions situated in the interlayer of stacked LDH layers are referred to as intercalating ions.

Such a stacked LDH comprising an organic anion or organoclay may also be delaminated or exfoliated, e.g. in a polymeric matrix. Within the context of the present specification the term "delamination" is defined as a reduction of the mean stacking degree of the LDH particles by at least partial de-layering of the LDH structure, thereby yielding a material containing significantly more individual LDH sheets per volume. The term "exfoliation" is defined as complete delamination, i.e. disappearance of periodicity in the direction perpendicular to the LDH sheets, leading to a random dispersion of individual layers in a medium, thereby leaving no stacking order at all.

Swelling or expansion of the LDHs, also called intercalation of the LDHs, can be observed with X-ray diffraction (XRD), because the position of the basal reflections—i.e. the $d(001)$ reflections—is indicative of the distance between the layers, which distance increases upon intercalation.

Reduction of the mean stacking degree can be observed as a broadening, up to disappearance, of the XRD reflections or by an increasing asymmetry of the basal reflections (001).

Characterization of complete delamination, i.e. exfoliation, remains an analytical challenge, but may in general be concluded from the complete disappearance of non-(hk0) reflections from the original LDH.

The ordering of the layers and, hence, the extent of delamination, can further be visualized with transmission electron microscopy (TEM).

The LDH of the invention may be any LDH known to the man skilled in the art, except that the morphology and the physical and chemical properties may be different. Typically, these LDHs are mineral LDHs which are able to expand or swell. Such LDHs have a layered structure comprising charged crystalline sheets (also referred to as individual LDH layers) with charge-balancing anions sandwiched in between. The terms "expand" and "swell" within the context of the present application refer to an increase in the distance between the charged crystalline sheets. Expandable LDHs can swell in suitable solvents, e.g. water, and can be further expanded and modified by exchanging the charge-balancing ions with other (organic) charge-balancing ions, which modification is also known in the art as intercalation.

The invention further pertains to a layered double hydroxide obtainable by the process of the invention. The layered double hydroxide according to the invention, and in particular the organically modified layered double hydroxide, has a low water content, a reduced alkalinity, and an improved thermo-stability compared to layered double hydroxides prepared in water. The LDHs of the invention generally have an improved compatibility with polymers and can be used in a wider range of polymers, in particular in polymers which will deteriorate upon blending in of the LDH. In such cases, the resulting polymer will generally have a lower degree of depolymerization, a lower degree of discolouration and/or a reduced degree of deterioration of anti-oxidants.

Due to the lower alkalinity of the resulting organically modified layered double hydroxides, when they are applied in a sulfur-condenzation rubber compound, their influence on the scorch time will be reduced compared to unmodified layered double hydroxides.

In one embodiment of the invention, LDH can be prepared with a morphology different from conventional LDHs. The average length over diameter ratio (L/D ratio) of the individual platelets in the LDH or organically modified LDH may exceed 200, preferably the L/D ratio is at least 300, more preferably the L/D ratio is at least 500, and even more preferably the L/D ratio is at least 1,000. The L/D ratio can be determined using electron microscopy such as scanning electron microscopy (SEM) and/or TEM. The length is the largest size of the platelets in the direction perpendicular to the stacking direction, and the diameter refers to the thickness of the clay particles in the stacking direction. If the clay is delaminated and/or exfoliated, the diameter can be as much as the thickness of one layer.

The layered double hydroxides of the invention have a layered structure corresponding to the general formula:

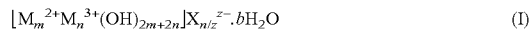

$$[M_m^{2+}M_n^{3+}(OH)_{2m+2n}]X_{n/z}^{z-}\cdot bH_2O \quad (I)$$

wherein $M^{2+}$ is a divalent metal ion such as $Zn^{2+}$, $Mn^{2+}$, $Ni^{2+}$, $Co^{2+}$, $Fe^{2+}$, $Cu^{2+}$, $Sn^{2+}$, $Ba^{2+}$, $Ca^{2+}$, $Mg^{2+}$, $M^{3+}$ is a trivalent metal ion such as $Al^{3+}$, $Cr^{3+}$, $Fe^{3+}$, $Co^{3+}$, $Mn^{3+}$, $Ni^{3+}$, $Ce^{3+}$ and $Ga^{3+}$, m and n have a value such that m/n=1 to 10, and b has a value in the range of from 0 to 10. X is a charge-balancing anion known to the man skilled in the art. The charge-balancing anion can be an organic anion or an inorganic anion. It is envisaged to use one or more organic anions and/or one or more inorganic anions.

Examples of inorganic anions known in the art include hydroxide, carbonate, bicarbonate, nitrate, chloride, bromide, sulfonate, sulfate, bisulfate, vanadates, tungstates, borates, phosphates, pillaring anions such as $HVO_4^-$, $V_2O_7^{4-}$, $HV_2O_{12}^{4-}$, $V_3O_9^{3-}$, $V_{10}O_{28}^{6-}$, $Mo_7O_{24}^{6-}$, $PW_{12}O_{40}^{3-}$, $B(OH)_4^-$, $B_4O_5(OH)_4^{2-}$, $[B_3O_3(OH)_4]^-$, $[B_3O_3(OH)_5]^{2-}$ $HBO_3^{2-}$, $HGaO_3^{2-}$, $CrO_4^{2-}$, and Keggin-ions. Preferably, the inorganic anion is selected from the group consisting of hydroxide, carbonate, bicarbonate, nitrate, chloride, bromide, sulfonate, sulfate, bisulfate, or mixtures thereof.

The organic anion used in the process of the invention can be any organic anion known in the art. The organic anion which can be suitably used in the process can be derived from a salt or an acid of the organic anion. Use of a salt-derived organic anion such as an alkali metal salt of stearate may be advantageous due to its higher solubility in the solvent compared to the corresponding acid-derived organic anion. Alternatively, use of an acid-derived organic anion may be advantageous, as salt ions will not be introduced into the waste stream, so that the waste stream does not need additional treatments to remove the salt ions, rendering the process cheaper and simpler.

Such organic anions include mono-, di- or polycarboxylic acids, sulfonic acids, phosphonic acids, and sulfate acids. Preferably, the organic anion comprises at least 2 carbon atoms, more preferably at least 8 carbon atoms, even more preferably at least 10 carbon atoms, and most preferably at least 12 carbon atoms; and the organic anion comprises at most 1,000 carbon atoms, preferably at most 500 carbon atoms, more preferably at most 100 carbon atoms, and most preferably at most 50 carbon atoms.

The organically modified layered double hydroxides prepared with the process of the invention preferably have a distance between the individual layers of above 1.5 nm. This has advantages in the use of these organically modified layered double hydroxides, e.g. if they are used in polymeric matrices. In polymeric matrices (e.g. in nanocomposite materials or coating compositions) the larger interlayer distance renders the layered double hydroxides of the invention easily processable in the polymeric matrix, and it further enables easy delamination and/or exfoliation of the layered double hydroxide, resulting in a mixture of the modified layered double hydroxide and the polymer matrix with improved physical properties. Preferably, the distance between the layers in an LDH according to the invention is at least 1.5 nm, more preferably at least 1.6 nm, even more preferably at least 1.8 nm, and most preferably at least 2 nm. The distance between the individual layers can be determined using X-ray diffraction and transmission electron microscopy (TEM), as outlined above.

It is further contemplated that the charge-balancing organic anion comprises one or more functional groups such as hydroxyl, amine, carboxylic acid, and vinyl. If such organically modified LDHs are used in polymeric matrices, these functional groups may interact or react with the polymer.

Suitable examples of organic anions of the invention are monocarboxylic acids such as fatty acids and rosin-based ions.

In one embodiment, the organic anion is a fatty acid or a salt thereof having from 8 to 22 carbon atoms. Such a fatty acid or salt thereof may be a saturated or unsaturated fatty acid. Suitable examples of such fatty acids or salts thereof are derived from caprylic acid, capric acid, lauric acid, myristic acid, palmitic acid, stearic acid, arachidic acid, decenoic acid, palmitoleic acid, oleic acid, linoleic acid, linolenic acid, and mixtures thereof.

In another embodiment of the present invention, the organic anion is rosin or a salt thereof. Rosin is derived from natural sources, is readily available, and is relatively inexpensive compared to synthetic organic anions. Typical examples of natural sources of rosin are gum rosin, wood rosin, and tall oil rosins. Rosin commonly is a suspension of a wide variety of different isomers of monocarboxylic tricyclic rosin acids usually containing about 20 carbon atoms. The tricyclic structures of the various rosin acids differ mainly in the position of the double bonds. Typically, rosin is a suspension of substances comprising levopimaric acid, neoabietic acid, palustric acid, abietic acid, dehydroabietic acid, seco-dehydroabietic acid, tetrahydroabietic acid, dihydroabietic acid, pimaric acid, and isopimaric acid. Rosin derived from natural sources also includes rosins, i.e. rosin suspensions, modified notably by polymerization, isomerization, disproportionation, hydrogenation, and Diels-Alder reactions with acrylic acid, anhydrides, and acrylic acid esters. The products obtained by these processes are referred to as modified rosins. Natural rosin may also be chemically altered by any process known in the art, such as for example reaction of the carboxyl group on the rosin with metal oxides, metal hydroxides or salts to form rosin soaps or salts (so-called resinates). Such chemically altered rosins are referred to as rosin derivatives.

Such rosin can be modified or chemically altered by introducing an organic group, an anionic group or a cationic group. The organic group may be a substituted or unsubstituted aliphatic or aromatic hydrocarbon having 1 to 40 carbon atoms. The anionic group may be any anionic group known to the man skilled in the art, such as a carboxylate or a sulfonate.

Further details of these rosin-based materials can be gleaned from D. F. Zinkel and J. Russell (in *Naval Stores, production-chemistry-utilization,* 1989, New York, Section II, Chapter 9) and J. B. Class ("Resins, Natural," Chapter 1: "Rosin and Modified Rosins," *Kirk-Othmer Encyclopedia of Chemical Technology,* online posting date: Dec. 4, 2000).

In one embodiment, the intercalating anions are a mixture of fatty acid and rosin.

Generally, at least 10% of the total amount of intercalating ions in the LDH types according to the invention is an organic anion, preferably at least 30%, more preferably at least 60%, and most preferably at least 90% of the total amount of intercalating ions is an organic anion. In a preferred embodiment, at least 10% of the total amount of intercalating anions is a fatty acid-derived or a rosin-based anion or a suspension of both anions, preferably at least 30%, more preferably at least 60%, and most preferably at least 90% of the total amount of intercalating ions is a fatty acid-derived or a rosin-based anion or a mixture of both anions.

The molar ratio between charge-balancing anions and aluminum contained in the LDH as used in the preparation of the organically modified LDH can have any value as desired. This ratio can range from 10:1 to 1:10, preferably from 5:1 to 1:5, and most preferably from 2:1 to 1:2. It is contemplated to use a ratio of 1.

The LDH of the invention includes hydrotalcite and hydrotalcite-like anionic LDHs. Examples of such LDHs are hydrotalcite and hydrotalcite-like materials, meixnerite, manasseite, pyroaurite, sjögrenite, stichtite, barberonite, takovite, reevesite, and desautelsite. A preferred LDH is hydrotalcite, which is an LDH having a layered structure corresponding to the general formula:

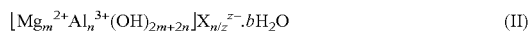

$$[Mg_m^{2+}Al_n^{3+}(OH)_{2m+2n}]X_{n/z}^{z-}.bH_2O \qquad (II)$$

wherein m and n have a value such that m/n=1 to 10, preferably 1 to 6, and b has a value in the range of from 0 to 10, generally a value of 2 to 6, and often a value of about 4. X is a charge-balancing ion as defined above.

It is preferred that m/n should have a value of 2 to 4, more particularly a value close to 3.

The LDH may be in any crystal form known in the art, such as described by Cavani et al. (*Catalysis Today,* 11 (1991), pp. 173-301) or by Bookin et al. (*LDHs and LDH Minerals,* (1993), Vol. 41(5), pp. 558-564). If the LDH is a hydrotalcite, the hydrotalcite may be a polytype having $3H_1$, $3H_2$, $3R_1$ or $3R_2$ stacking, for example.

The LDH of the invention can be used as a constituent in coating compositions, (printing) ink formulations, adhesive tackifiers, resin-based compositions, rubber compositions, cleaning formulations, drilling fluids and cements, plaster formulations, non-woven fabrics, fibres, foams, membranes, orthoplastic casts, (pre-)ceramic materials, and hybrid organic-inorganic composite materials such as polymer-based nanocomposites. The LDH of the invention can further be used in polymerization reactions such as solution polymerization, emulsion polymerization, and suspension polymerization. The organoclay can further serve as a crystallization aid in semi-crystalline polymers, such as poly-propylene. The LDH of the invention can further be used in applications where the separate functions of the LDH and the organic anions may be combined, such as in the paper making process or the detergent industry. Additionally, the LDH of the invention can be used in controlled release applications for medicines, pesticides, and/or fertilisers, and as sorbent of organic compounds such as pollutants, colourants, etc.

The invention further pertains to nanocomposite materials comprising a polymer and the LDH according to the invention, wherein the LDH comprises an organic anion having at least 8 carbon atoms. Generally, the organically modified LDHs have a considerable degree of exfoliation and/or delamination, and the amount of micrometer-sized modified LDHs will generally be low or even zero. Completely exfoliated and/or delaminated LDHs in the nanocomposite materials may render the material transparent to visible light, and thus make it suitable for use in optical applications.

The term "nanocomposite material" refers to a composite material wherein at least one component comprises an inorganic phase with at least one dimension in the 0.1 to 100 nanometer range.

Specifically suitable for use in the nanocomposite materials of the present invention are LDHs comprising a mixture of charge-balancing organic anions of which at least one is chemically altered so as to be more compatible or reactive with the polymer matrix. This results in an improvement of the interaction between the LDH and the polymer matrix, resulting in improved mechanical and/or viscoelastic properties. More compatible organic anions may comprise a substituted or unsubstituted aliphatic or aromatic hydrocarbon having 1 to 40 carbon atoms. Alternatively or additionally, at least one of the organic anions may comprise a reactive group selected from the group consisting of acrylate, methacrylate, hydroxyl, chloride, amine, epoxy, thiol, vinyl, di- and polysulfides, carbamate, ammonium, sulfonic, sulfinic, sulfonium, phosphonium, phosphinic, isocyanate, mercapto, hydroxyphenyl, hydride, acetoxy, and anhydride.

The polymer that can be suitably used in the nanocomposite material of the invention may be any polymer matrix known in the art. In this specification, the term "polymer" refers to an organic substance of at least two building blocks (i.e. monomers), thus including oligomers, copolymers, and polymeric resins. Suitable polymers for use in the polymer matrix are both polyadducts and polycondensates. The polymers can further be homopolymers or copolymers. Preferably, the polymeric matrix has a degree of polymerization of at least 20, more preferably of at least 50. In this connection, for a definition of the degree of polymerization, reference is made to P. J. Flory, *Principles of Polymer Chemistry,* New York, 1953.

Examples of suitable polymers are polyolefins, such as polyethylene or polypropylene, vinyl polymers, such as polystyrene, polymethyl methacrylate, polyvinyl chloride, polyvinylidene chloride or polyvinylidene fluoride, saturated polyesters, such as polyethylene terephthalate, polylactic acid, or poly(ε-caprolactone), unsaturated polyester resins, acrylate resins, methacrylate resins, polyimides, epoxy resins, phenol formaldehyde resins, urea formaldehyde resins, melamine formaldehyde resins, polyurethanes, polycarbonates, polyaryl ethers, polysulfones, polysulfides, polyamides, polyether imides, polyether esters, polyether ketones, polyether ester ketones, polysiloxanes, polyurethanes, polyepoxides, and blends of two or more polymers. Preferably used are polyolefins, vinyl polymers, polyesters, polycarbonates, polyamides, polyurethanes or polyepoxides.

The organoclay according to the invention is particularly suitable for use in thermoplastic polymers such as polyethylene, polypropylene, polystyrene, and acetal (co)polymers such as polyoxymethylene (POM), and in rubbers such as natural rubber (NR), styrene-butadiene rubber (SBR), polyisoprene (IR), polybutadiene (BR), polyisobutylene (IIR), halogenated polyisobutylene, butadiene nitrile rubber (NBR), hydrogenated butadiene nitrile (HNBR), styrene-isoprene-styrene (SIS) and similar styrenic block copolymers, poly-(epichlorohydrin) rubbers (CO, ECO, GPO), silicone rubbers (Q), chloroprene rubber (CR), ethylene propylene rubber (EPM), ethylene propylene diene rubber (EPDM), polysulfide rubber (T), fluorine rubbers (FKM), ethylene-vinyl acetate rubber (EVA), polyacrylic rubbers (ACM), polynorbornene (PNR), polyurethanes (AU/EU), and polyester/ether thermoplastic elastomers.

Particularly preferred are polymers or copolymers obtainable by polymerization of at least one ethylenically unsaturated monomer. Examples of such polymers are polyolefins and modified polyolefins, which are known to the man skilled in the art. The polyolefin or modified polyolefin can be a homopolymer or a copolymer. Suitable examples of such (modified) polyolefins are polyethylene, polypropylene, polybutylene, polystyrene, polyvinyl chloride, polyvinylidene chloride, and ethylene-propylene rubber, propylene-butene copolymer, ethylene-vinyl chloride copolymer, ethylene-vinyl acetate copolymer, acrylonitrile-butadiene-styrene copolymer (ABS), acrylonitrile-acrylate-styrene copolymer (AAS), methyl methacrylate-butadiene-styrene copolymer (MBS), chlorinated polyethylene, chlorinated polypropylene, ethylene-acrylate copolymer, vinyl chloride-propylene copolymer, and mixtures thereof. Even more preferred polymers are polyethylene, polypropylene, polystyrene, and polyvinyl chloride.

Specific examples of polyethylene are high-density polyethylene, low-density polyethylene, straight-chain low-density polyethylene, ultra-low-density polyethytlene, and ultra-high-molecular weight polyethylene. Examples of ethylene-based copolymers are ethylene-vinyl acetate copolymer (EVA), ethylene-ethyl acrylate copolymer (EEA), ethylene-methyl acrylate copolymer (EMA), and ethylene-acrylic acid copolymer (EAA).

The most preferred polymer is polypropylene. Any polypropylene known in the art will be suitable for use in the present invention. Examples of polypropylenes are given in "Polypropylene", Chapter 1: "Properties", by R. B. Lieberman in *Kirk-Othmer Encyclopedia of Chemical Technology*, online posting date Dec. 4, 2000. A particular class of polypropylenes of the invention is formed by the so-called thermoplastic polyolefins (TPOs), which include blends or reactor grades of polypropylene and EPR rubber.

The nanocomposite material of the invention may further comprise additives commonly used in the art. Examples of such additives are pigments, dyes, UV-stabilizers, heat-stabilizers, anti-oxidants, fillers (such as talc, chalk, lime, hydroxyapatite, silica, carbon black, glass fibres, natural and synthetic polymeric fibres and other (in)organic filler materials), flame retardants, nucleating agents, impact modifiers, plasticizers, rheology modifiers, cross-linking agents, coupling agents, and degassing agents.

These optional addenda and their corresponding amounts may be chosen according to need.

The amount of LDH in the nanocomposite material preferably is 0.01-75 wt %, more preferably 0.05-50 wt %, even more preferably 0.1-30 wt %, based on the total weight of the mixture.

LDH amounts of 10 wt % or less, preferably 1-10 wt %, more preferably 1-5 wt %, are especially advantageous for the preparation of polymer-based nano-composites, i.e. polymer-containing compositions according to the invention that contain delaminated—up to exfoliated—organically modified LDH.

LDH amounts of 10-70 wt %, more preferably 10-50 wt %, are especially advantageous for the preparation of so-called masterbatches, i.e. highly concentrated additive premixes for, e.g., polymer compounding. Although the clay in such masterbatches in general is not completely delaminated and/or exfoliated, further delamination and/or exfoliation may be reached at a later stage, if so desired, when blending the masterbatch with a further polymer to obtain true polymer-based nanocomposites.

The nanocomposite material of the present invention can be prepared according to any method known to a person skilled in the art. A skilled person may intimately mix a polymer matrix and the organoclay according to the invention by using melt-blending techniques, for instance. This method is preferred, as it is simple, cost-effective, and readily applicable in existing plants. It is also envisaged to prepare the clay of the invention in the presence of the polymer matrix, or in the presence of the monomers and/or oligomers before, while or after the monomers and/or oligomers are polymerized to form the polymer matrix. Further details of the preparation and processing of polypropylene can be found in "Polypropylene", Chapter 2: "Manufacture", and Chapter 3: "Processing", by R. B. Lieberman in *Kirk-Othmer Encyclopedia of Chemical Technology*, online posting date Dec. 4, 2000.

The nanocomposite material of the present invention can be used in any application in which these composite materials are conventionally used. The nanocomposite material can be suitably used in carpeting, automobile parts, container closures, lunch boxes, closures, medical devices, household articles, food containers, dishwashers, outdoor furniture, blow-moulded bottles, disposable non-woven fabrics, cables and wires, and packaging. Further details for polypropylene can be found in "Polypropylene", Chapter 5: "Uses", by R. B. Lieberman in *Kirk-Othmer Encyclopedia of Chemical Technology*, online posting date Dec. 4, 2000, and in brochure 022 PPe 10/01 of Basell entitled "Polypropylene: Textile, Rigid Packaging, Consumer, Film, Automotive, Electrical/Electronics and Home Appliances".

The nanocomposite materials comprising rubber can be suitably applied in tyre manufacture such as in green tyres, truck tyres, tractor tyres, off-the-road tyres, and aircraft tyres, in winter tyres, in latex products including gloves, condoms, balloons, catheters, latex thread, foam, carpet backings and rubberized coir and hair, in footwear, in civil engineering products such as bridge bearings, rubber-metal-laminated bearings, in belting and hoses, in non-tyre automotive applications including engine mounts, rubber bearings, seals, grommets, washers and boots, in wires and cables, and in pipe seals, medical closures, rollers, small solid tyres, mountings for domestic and commercial appliances, rubber balls and tubing, milking inflations and other agricultural-based applications.

If the rubber is a silicone rubber and the modified layered double hydroxide is in accordance with the present invention, these nanocomposite materials can suitably be applied in coating products including pressure-sensitive adhesives, plastic hardcoats, and paper release coatings, in fibre finishing applications including textile and hair care applications, sealants, adhesives, encapsulants, and solar cell units.

The present invention is further illustrated in the Examples below.

EXAMPLES

The following chemicals have been used:

Kortacid® PH05: a blend of palmitic and stearic acid, was supplied by Oleochemicals GmbH, a company of Akzo Nobel Chemicals.

Kortacid® PKGH: a blend of $C_{12}$ to $C_{22}$ fatty acids, was supplied by Oleochemicals GmbH, a company of Akzo Nobel Chemicals.
Dehydrogenated rosin: ex Hexion Specialty Products
Hydrogenated rosin: Foral® AX-E, ex Eastman Chemical
Prifac® 7990: modified fatty acid (ex Uniqema)
The following solvents have been used:
Iso-propanol (ex Acros)
Ethyl Proxitol®: ethoxy propan-2-ol (ex Shell)
Dowanol® DPNP: propoxy 2-methyl ethoxy propan-2-ol (ex Dow Chemicals)
Dowanol DPM: dipropylene glycol methyl ether (ex Dow Chemicals)
Dowanol PMA: propylene glycol methyl ether acetate (ex Dow Chemicals)
Dowanol PPh: Propylene glycol phenyl ether (ex Dow Chemicals)
Butyl Carbitol: diethylene glycol monobutyl ether (ex Acros)

Example 1

250 grams of an aqueous suspension of 20 wt % of a hydrotalcite-like layered double hydroxide in accordance with formula II, having an Mg/Al ratio of 2 and hydroxyl as the charge-balancing anion, and 250 grams of iso-propanol (ex Acros) were fed to a 1-liter glass reactor vessel equipped with a high-speed stirrer and heated to 80° C. Then 90 grams of Kortacid® PH05 in 250 grams of iso-propanol were added to the reactor vessel over a period of 45 minutes. Before the addition, the fatty acid blend was heated to 80° C. After the acid addition, the reactor vessel was kept at 80° C. for 3 more hours. Then the reactor vessel was cooled to about 50° C. and the resulting slurry was removed. The slurry was then centrifuged at 4,000 rpm for about 20 minutes. The liquid was decanted and the solids were dried under vacuum in an oven overnight at 80° C. The resulting hydrotalcite-like clay comprising the fatty acids blend was analyzed with X-ray diffraction to determine the inter-gallery spacing or d-spacing. The XRD pattern of the hydrotalcite-like clay as prepared above shows minor hydrotalcite-related non-(hk0) reflections, indicating intercalation of the anionic clay. The intercalate exhibits a characteristic d(00l) value of 2-theta=1.72.

The onset for thermal degradation of the organically modified layered double hydroxide as measured by thermal gravimetrical analysis (TGA) was 270° C.

Example 2

31.25 grams of an aqueous suspension of 20 wt % of a hydrotalcite-like layered double hydroxide in accordance with formula II, having an Mg/Al ratio of 2 and hydroxyl as the charge-balancing anion, and 200 grams of ethyl proxitol (ex Shell) were fed to a 500 ml glass reactor vessel equipped with a high-speed stirrer and heated to 80° C. Then 7.5 grams of Kortacid® PH05 in 10 grams of ethyl proxitol were added to the reactor vessel over a period of 15 minutes. Before the addition, the fatty acid blend was heated to 80° C. After the acid addition, the reactor vessel was heated while distilling off a water/ethyl proxitol azeotrope until a temperature of 130° C. was reached. Then the reactor vessel was cooled to about 50° C. and the resulting slurry was removed. The slurry was then centrifuged at 2,500 rpm for about 10 minutes. The liquid was decanted and the solids were dried under vacuum in an oven for 3 hours at 80° C.

The resulting hydrotalcite-like clay comprising the fatty acids blend was analyzed with X-ray diffraction to determine the inter-gallery spacing or d-spacing. The XRD pattern of the hydrotalcite-like clay as prepared above shows minor hydrotalcite-related non-(hk0) reflections, indicating intercalation of the anionic clay. The intercalate exhibits a characteristic d(00l) value of 46.5 Å.

Example 3

34.5 grams of an aqueous suspension of 20 wt % of a hydrotalcite-like layered double hydroxide in accordance with formula II, having an Mg/Al ratio of 2 and hydroxyl as the charge-balancing anion, and 200 grams of Dowanol DPNP were fed to a 500 ml glass reactor vessel equipped with a high-speed stirrer and heated to 80° C. Then 7.5 grams of Kortacid® PH05 in 10 grams of Dowanol DPNP were added to the reactor vessel over a period of 15 minutes. Before the addition, the fatty acid blend was heated to 80° C. After the acid addition, the reactor vessel was heated while distilling off the water/Dowanol DPNP mixture at a temperature of 130° C. The dry product was cooled to room temperature, and the solids were dried under vacuum in an oven for 3 hours at 80° C.

The XRD pattern of the hydrotalcite-like clay as prepared above shows minor hydrotalcite-related non-(hk0) reflections, indicating intercalation of the anionic clay. The intercalate exhibits a characteristic d(00l) value of 47.0 Å.

Example 4

31.25 grams of an aqueous suspension of 20 wt % of a hydrotalcite-like layered double hydroxide in accordance with formula II, having an Mg/Al ratio of 2 and hydroxyl as the charge-balancing anion, and 200 grams of Dowanol DPM were fed to a 500 ml glass reactor vessel equipped with a high-speed stirrer and heated to 80° C. Then 6.0 grams of Kortacid® PKGH were heated to 80° C. and added to the reactor vessel. After the acid addition, the reactor vessel was heated while distilling off the water/Dowanol DPM mixture at a temperature of 130° C. The dry product was cooled to room temperature, and the solids were dried under vacuum in an oven for 3 hours at 80° C.

The XRD pattern of the hydrotalcite-like clay as prepared above shows minor hydrotalcite-related non-(hk0) reflections, indicating intercalation of the anionic clay. The intercalate exhibits a characteristic d(00l) value of 32 Å.

Example 5

31.25 grams of an aqueous suspension of 20 wt % of a hydrotalcite-like layered double hydroxide in accordance with formula II, having an Mg/Al ratio of 2 and hydroxyl as the charge-balancing anion, and 200 grams of Dowanol PMA were fed to a 500 ml glass reactor vessel equipped with a high-speed stirrer and heated to 80° C. Then 6.0 grams of Kortacid® PKGH were added to the reactor vessel. Before the addition, the fatty acid blend was heated to 80° C. After the acid addition, the reactor vessel was heated while distilling off the water/Dowanol PMA mixture at a temperature of 130° C. Then the reactor vessel was cooled to about 50° C. and the resulting slurry was removed. The slurry was then centrifuged at 2,500 rpm for about 10 minutes. The liquid was decanted and the solids were dried under vacuum in an oven for 3 hours at 80° C.

The XRD pattern of the hydrotalcite-like clay as prepared above shows minor hydrotalcite-related non-(hk0) reflections, indicating intercalation of the anionic clay. The intercalate exhibits a characteristic d(00l) value of 48 Å.

Example 6

31.25 grams of an aqueous suspension of 20 wt % of a hydrotalcite-like layered double hydroxide in accordance with formula II, having an Mg/Al ratio of 2 and hydroxyl as the charge-balancing anion, and 200 grams of Dowanol PPh were fed to a 500 ml glass reactor vessel equipped with a high-speed stirrer and heated to 80° C. Then 6.0 grams of Kortacid® PKGH were added to the reactor vessel. Before the addition, the fatty acid blend was heated to 80° C. After the acid addition, the reactor vessel was heated while distilling off the water/Dowanol PPh mixture at a temperature of 130° C. Then the reactor vessel was cooled to about 50° C. and the resulting slurry was removed. The slurry was then centrifuged at 4,000 rpm for about 10 minutes. The transparent liquid was removed, and the solids (top layer of slurry) and the gel (bottom layer of slurry) were washed with acetone and dried under vacuum in an oven for 3 hours at 80° C.

The XRD pattern of the hydrotalcite-like clay as prepared above shows minor hydrotalcite-related non-(hk0) reflections, indicating intercalation of the anionic clay. The intercalate exhibits a characteristic d(00l) value of 29 Å.

Example 7

31.25 grams of an aqueous suspension of 20 wt % of a hydrotalcite-like layered double hydroxide in accordance with formula II, having an Mg/Al ratio of 2 and hydroxyl as the charge-balancing anion, and 200 grams of Butyl Carbitol were fed to a 500 ml glass reactor vessel equipped with a high-speed stirrer and heated to 80° C. Then 6.0 grams of Kortacid® PKGH were added to the reactor vessel. Before the addition, the fatty acid blend was heated to 80° C. After the acid addition, the reactor vessel was heated while distilling off the water/Butyl Carbitol mixture at a temperature of 120° C. Then the reactor vessel was cooled to about 50° C. and the resulting slurry was removed. The slurry was then centrifuged at 4,000 rpm for about 10 minutes. The transparent liquid and the solids (top layer of slurry) were removed, and the gel (bottom layer of slurry) was washed with acetone and dried under vacuum in an oven for 3 hours at 80° C.

The XRD pattern of the hydrotalcite-like clay as prepared above shows minor hydrotalcite-related non-(hk0) reflections, indicating intercalation of the anionic clay. The intercalate exhibits a characteristic d(00l) value of 30 Å.

Example 8

31.25 grams of an aqueous suspension of 20 wt % of a hydrotalcite-like layered double hydroxide in accordance with formula II, having an Mg/Al ratio of 2 and hydroxyl as the charge-balancing anion, and 200 grams of Dowanol PPh were fed to a 500 ml glass reactor vessel equipped with a high-speed stirrer and heated to 80° C. Then 9.75 grams of dehydrogenated rosin were added to the reactor vessel. Before the addition, the rosin was heated to 80° C. After the acid addition, the reactor vessel was heated while distilling off the water/Dowanol PPh mixture at a temperature of 130° C. Then the reactor vessel was cooled to about 50° C. and the resulting slurry was removed. The slurry was then centrifuged at 4,000 rpm for about 10 minutes. The transparent liquid was removed and the gel (bottom layer of slurry) was washed with acetone, and dried under vacuum in an oven for 3 hours at 80° C.

The XRD pattern of the hydrotalcite-like clay as prepared above shows minor hydrotalcite-related non-(hk0) reflections, indicating intercalation of the anionic clay. The intercalate exhibits a characteristic d(00l) value of 25 Å.

Example 9

62.5 grams of an aqueous suspension of 20 wt % of a hydrotalcite-like layered double hydroxide in accordance with formula II, having an Mg/Al ratio of 2 and hydroxyl as the charge-balancing anion, and 150 grams of ethyl proxitol (ex Shell) were fed to a 500 ml glass reactor vessel equipped with a high-speed stirrer and heated to 85° C. Then 4.06 grams of Kortacid® PKGH and 12.18 grams of hydrogenated rosin were added to the reactor vessel. Before the addition, the fatty acid/rosin blend was heated to 85° C. In addition, 50 grams of ethyl proxitol were added. After the blend addition, the reactor vessel was heated while distilling off a water/ethyl proxitol azeotrope until a temperature of 120° C. was reached. Then the reactor vessel was cooled to about 50° C., 100 grams of ethyl proxitol were added, and the resulting slurry was removed. The slurry was then centrifuged at 2,500 rpm for about 10 minutes. The liquid was decanted, and the solids were washed with acetone and dried under vacuum in an oven overnight at 80° C.

The XRD pattern of the hydrotalcite-like clay as prepared above shows minor hydrotalcite-related non-(hk0) reflections, indicating intercalation of the anionic clay. The intercalate exhibits a characteristic d(00l) value of 29 Å.

Example 10

62.5 grams of an aqueous suspension of 20 wt % of a hydrotalcite-like layered double hydroxide in accordance with formula II, having an Mg/Al ratio of 2 and hydroxyl as the charge-balancing anion, and 150 grams of ethyl proxitol (ex Shell) were fed to a 500 ml glass reactor vessel equipped with a high-speed stirrer and heated to 85° C. Then 12.15 grams of Kortacid® PKGH and 100 grams of ethyl proxitol were added to the reactor vessel. Before the addition, the fatty acid blend was heated to 85° C. After the fatty acid blend and ethyl proxitol additions, the reactor vessel was heated while distilling off a water/ethyl proxitol azeotrope until a temperature of 120° C. was reached. Another 100 grams of ethyl proxitol were added to the slurry. Then the reactor vessel was cooled to about 50° C., and the resulting slurry was removed. The slurry was then centrifuged at 2,500 rpm for about 10 minutes. The liquid was decanted, and the solids were washed with acetone and dried under vacuum in an oven for 6 hours at 80° C.

The XRD pattern of the hydrotalcite-like clay as prepared above shows minor hydrotalcite-related non-(hk0) reflections, indicating intercalation of the anionic clay. The intercalate exhibits a characteristic d(00l) value of 28 Å.

Example 11

62.5 grams of an aqueous suspension of 20 wt % of a hydrotalcite-like layered double hydroxide in accordance with formula II, having an Mg/Al ratio of 2 and hydroxyl as the charge-balancing anion, and 150 ml of 2-(2-ethylhexyloxy) ethanol were fed to a 500 ml glass reactor vessel equipped with a high-speed stirrer and heated to 85° C. Then 12.15 grams of Kortacid® PKGH were added to the reactor vessel. Before the addition, the fatty acid blend was heated to 85° C. After the fatty acid blend addition, the reactor vessel was heated while distilling off a water/2-(2-ethylhexyloxy) ethanol azeotrope until a temperature of 125° C. was reached. Then the reactor vessel was cooled to about 50° C., and the resulting slurry was removed. The slurry was then centrifuged at 4,000 rpm for about 10 minutes. The liquid was decanted, and the solids were washed with acetone and dried under vacuum in an oven for 5 hours at 80° C.

The XRD pattern of the hydrotalcite-like clay as prepared above shows minor hydrotalcite-related non-(hk0) reflections, indicating intercalation of the anionic clay. The intercalate exhibits a characteristic d(00l) value of 30 Å.

Example 12

31.25 grams of an aqueous suspension of 20 wt % of a hydrotalcite-like layered double hydroxide in accordance with formula II, having an Mg/Al ratio of 2 and hydroxyl as the charge-balancing anion, and 200 grams of ethyl proxitol (ex Shell) were fed to a 500 ml glass reactor vessel equipped with a high-speed stirrer and heated to 85° C. Then 5.78 grams of Kortacid® PKGH and 0.28 grams of aminododecanoic acid were added to the reactor vessel. Before the addition, the fatty acid/aminododecanoic acid blend was heated to 85° C. After the blend addition, the reactor vessel was heated while distilling off a water/ethyl proxitol azeotrope until a temperature of 120° C. was reached. 100 grams of ethyl proxitol were added to the slurry. Then the reactor vessel was cooled to about 50° C., and the resulting slurry was removed. The slurry was then centrifuged at 4,000 rpm for about 10 minutes. The liquid was decanted, and the solids were washed with acetone and dried under vacuum in an oven overnight at 80° C.

The XRD pattern of the hydrotalcite-like clay as prepared above shows minor hydrotalcite-related non-(hk0) reflections, indicating intercalation of the anionic clay. The intercalate exhibits a characteristic d(00l) value of 25 Å.

Example 13

31.25 grams of an aqueous suspension of 20 wt % of a hydrotalcite-like layered double hydroxide in accordance with formula II, having an Mg/Al ratio of 2 and hydroxyl as the charge-balancing anion, and 200 grams of ethyl proxitol were fed to a 500 ml glass reactor vessel equipped with a high-speed stirrer and heated to 85° C. Then 3.75 grams of Kortacid® PH05 and 4.87 grams of dehydrogenated rosin were added to the reactor vessel. Before the addition, the fatty acid/rosin blend was heated to 85° C. After the blend addition, 150 grams of ethyl proxitol were added, and the reactor vessel was heated while distilling off a water/ethyl proxitol azeotrope until a temperature of 120° C. was reached. Then the reactor vessel was cooled to about 50° C., and the resulting slurry was removed. The slurry was then centrifuged at 4,000 rpm for about 10 minutes. The liquid was decanted, and the solids were dried under vacuum in an oven for 5 hours at 80° C.

The XRD pattern of the hydrotalcite-like clay as prepared above shows minor hydrotalcite-related non-(hk0) reflections, indicating intercalation of the anionic clay. The intercalate exhibits a characteristic d(00l) value of 29 Å.

Example 14

50 grams of an aqueous suspension of 20 wt % of a hydrotalcite-like layered double hydroxide in accordance with formula II, having an Mg/Al ratio of 2 and hydroxyl as the charge-balancing anion, and 150 grams of ethyl proxitol (ex Shell) were fed to a 500 ml glass reactor vessel equipped with a high-speed stirrer and heated to 85° C. Then 6.3 grams of Kortacid® PKGH and 6.3 grams of hydrogenated rosin in 50 grams of ethyl proxitol were added to the reactor vessel over a period of 15 minutes. Before the addition, the fatty acid/rosin blend was heated to 85° C. After the blend addition, the reactor vessel was heated while distilling off a water/ethyl proxitol azeotrope until a temperature of 120° C. was reached. Then the reactor vessel was cooled to about 50° C., 100 grams of ethyl proxitol were added, and the resulting slurry was removed. The slurry was then centrifuged at 2,500 rpm for about 10 minutes. The liquid was decanted, and the solids were washed with acetone and dried under vacuum in an oven overnight at 80° C.

The XRD pattern of the hydrotalcite-like clay as prepared above shows minor hydrotalcite-related non-(hk0) reflections, indicating intercalation of the anionic clay. The intercalate exhibits a characteristic d(00l) value of 29 Å.

Example 15

100 grams of an aqueous suspension of 20 wt % of a hydrotalcite-like layered double hydroxide in accordance with formula II, having an Mg/Al ratio of 2 and hydroxyl as the charge-balancing anion, and 21 grams of ethyl proxitol (ex Shell) were fed to a 500 ml glass reactor vessel equipped with a high-speed stirrer and heated to 85° C. Then 25.16 grams of Kortacid® PKGH dissolved in 21.85 grams of ethyl proxitol were added to the reactor vessel over a period of 30 minutes. Before the addition, the fatty acid blend was heated to 85° C. The resulting mixture was stirred for 3 hours. Then the reactor vessel was cooled to about 50° C., and the resulting slurry was removed. The slurry was then centrifuged at 4,000 rpm for about 10 minutes. The liquid was decanted, and the solids were washed with water and dried under vacuum in an oven overnight at 80° C.

The XRD pattern of the hydrotalcite-like clay as prepared above shows minor hydrotalcite-related non-(hk0) reflections, indicating intercalation of the anionic clay. The intercalate exhibits a characteristic d(00l) value of 37.7 Å.

Example 16

100 grams of an aqueous suspension of 20 wt % of a hydrotalcite-like layered double hydroxide in accordance with formula II, having an Mg/Al ratio of 2 and hydroxyl as the charge-balancing anion, and 12.5 grams of ethyl proxitol (ex Shell) were fed to a 500 ml glass reactor vessel equipped with a high-speed stirrer and heated to 85° C. Then 25.16 grams of Kortacid® PKGH dissolved in 12.5 grams of ethyl proxitol were added to the reactor vessel over a period of 30 minutes. Before the addition, the fatty acid blend was heated to 85° C. The resulting mixture was stirred for 3 hours. Then the reactor vessel was cooled to about 50° C., and the resulting slurry was removed. The slurry was then centrifuged at 4,000 rpm for about 10 minutes. The liquid was decanted, and the solids were washed with water and dried under vacuum in an oven overnight at 80° C.

The XRD pattern of the hydrotalcite-like clay as prepared above shows minor hydrotalcite-related non-(hk0) reflections, indicating intercalation of the anionic clay. The intercalate exhibits a characteristic d(00l) value of 38.4 Å.

Example 17

1,995 grams of magnesium oxide (Zolitho® 40, ex Martin Marietta Magnesia Specialties LLC) and 1,728 grams aluminium trihydroxide (Alumill F505) were mixed in 7,500 grams of demineralized water and ground to an average particle size ($d_{50}$) of 1.5 μm. Part of this slurry was diluted with demineralized water to a solids content of 8.8 wt %. 1.36 kg of the diluted slurry were fed to an oil-heated autoclave equipped with a high-speed stirrer and heated to 80° C. Before the slurry addition, the autoclave was fed with 1.25 kg of 2-ethoxy propanol and heated to 80° C. The autoclave was then heated to 120° C., and 354 grams of a 50/50 mixture by weight of Kortacid® PH05 and Prifac 7990 were added over a period of 15 minutes. Before addition, the fatty acid blend was heated to 120° C. After the acid addition, the autoclave was heated to 170° C. and kept there for 1 hour. Then the autoclave was cooled to about 40° C., and the resulting slurry was removed. The slurry was filtered and washed extensively with acetone. The resulting material was dried under vacuum in an oven overnight at 80° C.

The resulting hydrotalcite-like clay comprising the fatty acids blend was analyzed with X-ray diffraction to determine the inter-gallery spacing or d-spacing. The XRD pattern of the hydrotalcite-like clay as prepared above shows minor hydrotalcite-related non-(hk0) reflections, indicating intercalation of the anionic clay. The XRD suggests d(00l) values of 52 and 30 Å. In addition, the SEM analysis of the washed powder reveals a very high aspect ratio (L/D>10,000) of the resulting rectangularly shaped platelets.

Example 18

665 grams of magnesium oxide (Zolitho® 40, ex Martin Marietta Magnesia Specialties LLC) and 576 grams aluminium trihydroxide (Alumill F505) were mixed in 2,500 grams of demineralized water and ground to an average particle size ($d_{50}$) of 1.5 μm. Part of this slurry was diluted with demineralized water to a solids content of 9.6 wt %. 229 g of the diluted slurry were fed to an oil-heated autoclave equipped with a high-speed stirrer and heated to 90° C. Before the slurry addition, the autoclave was fed with 209 g of 2-ethoxy propanol and heated to 80° C. The autoclave was heated to 120° C. and kept there for about 15 minutes. Then the autoclave was heated to 170° C. and kept there for 1 hour. After reaction, the autoclave was cooled below 60° C., and the resulting slurry was removed. The slurry was filtered and washed extensively with acetone. The resulting material was dried under vacuum in an oven overnight at 80° C.

The resulting hydrotalcite-like clay comprising was analyzed with X-ray diffraction to determine the inter-gallery spacing or d-spacing. The XRD pattern of the hydrotalcite-like clay as prepared above shows (hk0) and (00l) reflections typical for a hydrotalcite structure and some minor signals corresponding to brucite.

The invention claimed is:

1. A process for preparing a layered double hydroxide comprising a charge-balancing anion, the process comprising the steps of:
    (a) preparing a precursor suspension or solution comprising a divalent metal ion source, a trivalent metal ion source, water, and a solvent which is miscible with water and in which at least 5 g/l of a charge-balancing anion precursor can be dissolved;
    (b) treating the precursor suspension or solution to obtain the layered double hydroxide,
    wherein the charge-balancing anion precursor is added to the suspension or solution before, during or after step (b), and wherein, if the charge-balancing anion is an organic anion, less than 50 wt % of the charge-balancing anion precursor, based on the total weight of charge-balancing anion precursor, is a salt, with the proviso that the charge-balancing anion is not carbonate.

2. The process according to claim 1 wherein the solvent is an alcohol having one hydroxyl group.

3. The process according to claim 1 wherein the charge-balancing anion is an organic anion.

4. The process according to claim 3 wherein the organic anion comprises 8 or more carbon atoms.

5. The process according to claim 3 wherein the charge-balancing anion precursor is added to the precursor suspension or solution before step (b) proceeds.

6. The process according to claim 3 wherein the charge-balancing anion precursor is added following the formation of the layered double hydroxide, wherein the charge-balancing anion is selected from the group consisting of hydroxyl, nitrate, phosphate, phosphonate, sulfonate, sulfate, bisulfite, and halide.

7. The process according to claim 1 wherein the divalent metal ion is $Mg^{2+}$ and the trivalent metal ion is $Al^{3+}$.

8. The process according to claim 1 further comprising the steps of:
    (c) preparing a suspension of a suspending medium and the layered double hydroxide comprising the charge-balancing anion, wherein the charge-balancing anion is selected from the group consisting of hydroxyl, nitrate, phosphate, phosphonate, sulfonate, sulfate, bisulfite, and halide;
    (d) treating the suspension to obtain the layered double hydroxide comprising an organic anion as the charge-balancing anion,
    wherein a charge-balancing anion precursor is added during step (c) or (d).

9. The process according to claim 8 wherein the suspending medium comprises at least one of water and a solvent which is miscible with water and in which at least 5 g/l of the organic anion precursor can be dissolved.

10. The process according to claim 8 wherein the suspending medium is the same as the solvent used in step (a).

11. A process for preparing a layered double hydroxide comprising an organic anion as a charge-balancing anion, the process comprising the steps of:
    (a) preparing a suspension of a layered double hydroxide comprising a charge-balancing anion selected from the group consisting of hydroxyl, nitrate, phosphate, phosphonate, sulfonate, sulfate, bisulfite, and halide, and a solvent;
    (b) treating the suspension to obtain the layered double hydroxide,
    wherein a charge-balancing anion precursor is added to the suspension during step (a) or (b), and wherein the solvent is miscible with water and can have at least 5 g/l of the charge-balancing anion precursor dissolved therein.

12. A layered double hydroxide comprising a charge-balancing anion obtained by the process of claim 11.

13. The layered double hydroxide according to claim 12 wherein the charge-balancing anion is an organic anion and the distance between the individual layers of the layered double hydroxide is above 1.5 nm.

14. A nanocomposite material comprising a polymer and the layered double hydroxide according to claim 13.

15. A masterbatch comprising a polymer and the layered double hydroxide according to claim 13 wherein the amount of layered double hydroxide is between 10 and 70 wt % and the amount of polymer is between 30 and 90 wt %, based on the total weight of the masterbatch.

16. The process according to claim 2 wherein the alcohol is selected from the group consisting of ethanol, n-propanol, isopropanol, butanol and an alkoxylated alcohol according to the formula

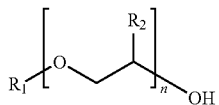

wherein $R_1$ is a $C_1$-$C_8$ alkyl or phenyl, $R_2$ is hydrogen or methyl, and n is an integer from 1 to 5.

17. The process according to claim 2 wherein the charge-balancing anion is an organic anion.

18. The process according to claim 4 wherein the charge-balancing anion precursor is added to the precursor suspension or solution before step (b) proceeds.

19. The process according to claim 9 wherein the suspending medium is the same as the solvent used in step (a).

20. A masterbatch comprising a polymer and the layered double hydroxide according to claim 12 wherein the amount of layered double hydroxide is between 10 and 70 wt % and the amount of polymer is between 30 and 90 wt %, based on the total weight of the masterbatch.

* * * * *